United States Patent [19]
Kinton

[11] Patent Number: 6,065,905
[45] Date of Patent: May 23, 2000

[54] ROTARY CUTTING TOOL WITH ENHANCED DAMPING

[75] Inventor: John D. Kinton, St. Peters, Mo.

[73] Assignee: McDonnell Douglas Corporation, St. Louis, Mo.

[21] Appl. No.: 09/114,447

[22] Filed: Jul. 13, 1998

[51] Int. Cl.[7] ................................................ B23B 27/14
[52] U.S. Cl. ........................ 407/53; 407/59; 407/119; 407/120; 82/163
[58] Field of Search .................. 407/53, 54, 55, 407/59, 118, 119, 120, 32; 82/904, 1.11, 163; 409/141; 408/143

[56] References Cited

U.S. PATENT DOCUMENTS

| | | |
|---|---|---|
| 1,887,372 | 11/1932 | Emmons . |
| 2,426,359 | 8/1947 | Lankheet . |
| 2,581,449 | 1/1952 | See ...................................... 407/119 X |
| 2,645,471 | 7/1953 | King ..................................... 407/118 X |
| 3,292,237 | 12/1966 | Fisher . |
| 3,496,973 | 2/1970 | Ballard . |
| 3,882,581 | 5/1975 | Merenes ................................... 407/119 |
| 3,945,807 | 3/1976 | Fukutome . |
| 4,050,840 | 9/1977 | Skingle . |
| 4,555,204 | 11/1985 | Cassidenti . |
| 4,826,365 | 5/1989 | White . |
| 4,971,485 | 11/1990 | Nomura et al. ...................... 407/119 X |
| 5,033,579 | 7/1991 | Vanderstraeten . |
| 5,322,394 | 6/1994 | Okanishi et al. . |
| 5,351,592 | 10/1994 | Bloom . |
| 5,599,144 | 2/1997 | Bickham et al. . |
| 5,914,181 | 6/1999 | Uchino et al. ....................... 407/119 X |

FOREIGN PATENT DOCUMENTS 1171240  8/1985  U.S.S.R. ................. 408/143

Primary Examiner—Henry W. H. Tsai
Attorney, Agent, or Firm—Alston & Bird LLP

[57] ABSTRACT

A rotary cutting tool such as an endmill includes a coating on its radial relief surfaces for enhancing damping of vibratory motion of the tool at speeds which permit the relief surfaces to rub on the workpiece being machined. The coating has a hardness substantially less than that of the remainder of the tool. In a preferred embodiment, the tool is made of tungsten carbide, steel, or ceremet, and the coating is aluminum or an alloy thereof, having a thickness of about 0.0015 inch for tools with cutting diameters of about ¼ inch to about 1 inch.

17 Claims, 2 Drawing Sheets

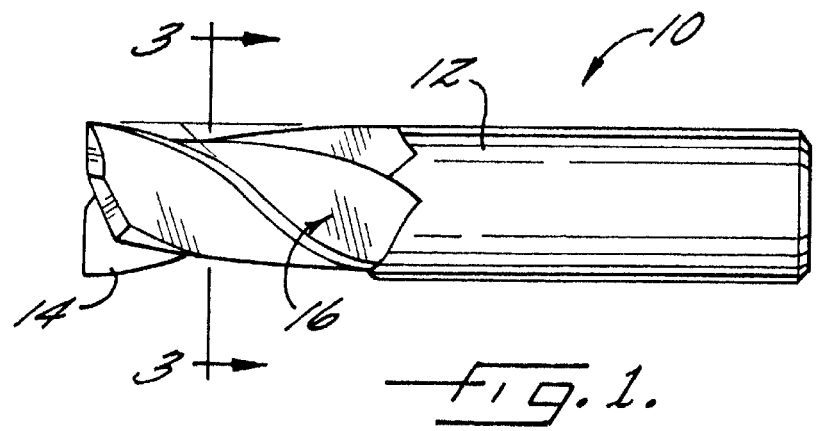
Fig. 1.
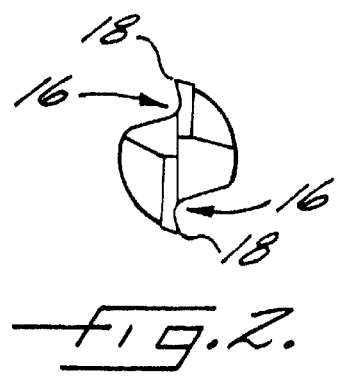
Fig. 2.
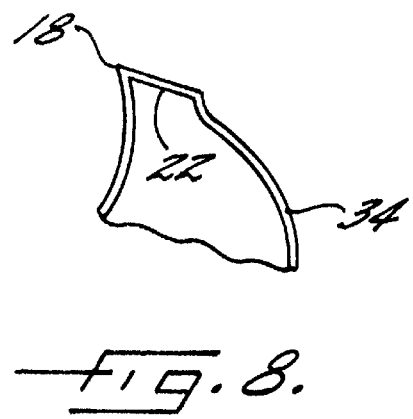
Fig. 8.
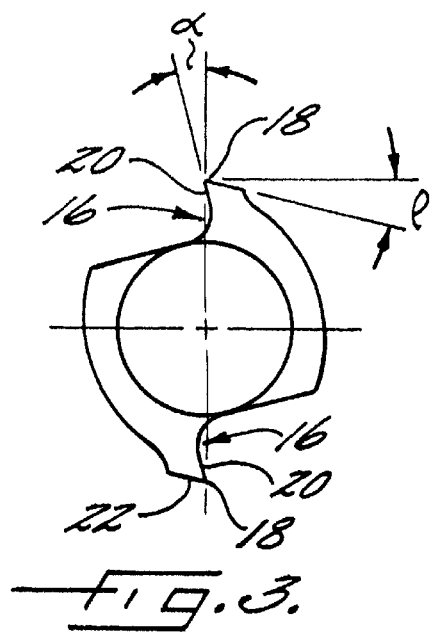
Fig. 3.
Fig. 4.

ROTARY CUTTING TOOL WITH ENHANCED DAMPING

FIELD OF THE INVENTION

The present invention relates to rotary cutting tools and, more particularly, to rotary cutting tools having coatings of a damping material to reduce chatter and vibration of the tools.

BACKGROUND OF THE INVENTION

Chatter and vibration are problems in the high-speed machining of metals with rotary cutting tools. Indeed, the limiting factor for metal removal rates in high-speed machining of metals is the dynamic stability of the tool. For a given rotary cutting tool such as an endmill or drill bit, there exists a set of rotational speed and depth of cut combinations at which the tool will become unstable and chatter or vibrate with sufficient amplitude that the quality of the machined surface is seriously compromised and/or the tool becomes damaged. It will be appreciated that, in order to improve efficiency of a cutting operation, it is desirable to be able to delay the onset of cutter instability to as high a rotational speed as possible so that higher metal removal rates can be accomplished.

Cutter stability can be achieved at higher rotational speeds by management of the dynamics of the cutter system which typically includes the cutting tool, tool holder, and spindle of the machine. At lower rotational speeds, a phenomenon known as "process damping" can provide cutter stability. Process damping is a phenomenon that occurs during machining with a rotary cutting tool, in which the radial relief surfaces of the tool come into contact with and rub against the workpiece being machined as a result of waviness left on the machined surface caused by cutter vibration. This rubbing action damps the cutter vibration, thereby reducing or eliminating the vibration. For a given tool, process damping will occur whenever the rotational speed is sufficiently low to allow the relief surfaces to rub against the workpiece.

For cutting tools having a large length-to-diameter ratio, the problem of chatter is particularly vexing because such tools are inherently less capable of taking advantage of system dynamics than tools having smaller length-to-diameter ratios, since the tool represents the most flexible part of the system. Thus, for all rotary cutting tools, and particularly for those relatively flexible tools having larger length-to-diameter ratios, it is beneficial in terms of part production rates and production efficiency to increase the limiting speed at which dynamic stability can be achieved through process damping.

A number of approaches have been tried for improving the dynamic stability of rotary cutting tools by increasing the damping of the cutting system of which the tool forms a part. Typically, damping is increased by adding what essentially amounts to a spring-mass damper to the cutting tool. For example, U.S. Pat. No. 2,426,359 discloses a boring bar in which an insert of a damping material is provided in the shank portion of the boring bar to increase the overall damping of the tool. U.S. Pat. No. 3,292,237 discloses a cutting tool known in the art as an insert tool in which an insert having a cutting edge is made of a very hard material and is affixed in a body portion of a tool. The patent discloses coating the body portion of the tool with a plastic coating in order to increase the overall damping of the tool.

Similarly, U.S. Pat. No. 5,033,579 discloses a circular saw blade in which a coating of a damping material is applied to the circular side surfaces of the blade in order to increase the overall damping of the blade.

SUMMARY OF THE INVENTION

The present invention enhances the damping of a rotary cutting tool by coating the radial relief surfaces of the tool with a damping material having a lower hardness than that of the tool in order to promote process damping of the tool. The present invention provides a cutting tool which can run stably at increased rotational speeds by virtue of the coating on the radial relief surfaces. Additionally, the cutting tool of the present invention is capable of taking a greater depth of cut than a similar tool without the coating on the relief surfaces.

In a preferred embodiment of the invention particularly suitable for machining aluminum or its alloys, the tool is made of tungsten carbide, steel, or ceremet and the coating is aluminum or an alloy thereof. Alternatively, the tool may be made of other materials, and the coating may be a metal or alloy other than aluminum, or a non-metallic material, as long as the damping material is softer than the tool but sufficiently hard that it is not abraded away by the workpiece.

The coating thickness is primarily dictated by the relief angle of the radial relief surfaces. In accordance with one preferred embodiment of the invention, a coating of damping material having a thickness of about 0.0005–0.0025 inch, and more preferably about 0.0015 inch, is applied uniformly over the entire fluted end portion of a cutting tool. This assures that the radial relief surfaces are coated without requiring expensive masking to coat only the radial relief surfaces. When the tool is put into service, the softer damping material is quickly worn off the cutting edges, but remains on the radial relief surfaces or at least on the portions of those surfaces that contact a workpiece during process damping.

The invention is especially suitable in cutting or milling systems in which the cutting tool represents the most flexible part of the system. For example, cutting tools having a length-to-diameter ratio of about 3 or greater are particularly susceptible to chatter, and frequently represent the most flexible component of the milling system. The invention is particularly advantageous for use with such cutting tools.

BRIEF DESCRIPTION OF THE DRAWINGS

Additional objects, features, and advantages of the invention will become apparent from the following description of specific embodiments thereof taken in conjunction with the accompanying drawings in which:

FIG. 1 is a side elevation view of a cutting tool in accordance with a preferred embodiment of the invention;

FIG. 2 is an end view of the cutting tool of FIG. 1 FIG. 3 is a cross-sectional view taken along line 3—3 of FIG. 1;

FIG. 4 is an enlarged view of a cutting edge of the cutting tool, showing a coating on the relief surface in accordance with the invention;

FIG. 8 is a cross-sectional view similar to FIG. 4 showing the cutting edge of another preferred embodiment of the invention having a coating over the entire end portion of the tool.

DETAILED DESCRIPTION OF THE DRAWINGS

Figure 5:
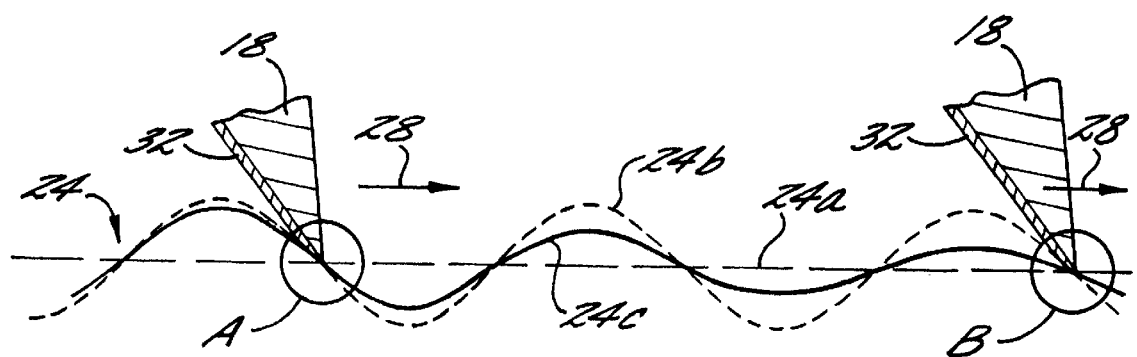
FIG. 5 is a schematic view showing the cutting edge of a tool in accordance with an embodiment of the invention interacting with the surface of a workpiece with zero vibration, undamped vibration, and damped vibration.

The invention is now explained by reference to certain preferred embodiments thereof, it being understood that the invention is not limited to these embodiments and various modifications may be made without departing from the scope of the appended claims.

With reference to FIGS. 1–4, a first embodiment of a cutting tool 10 in accordance with the invention is shown. The tool 10 comprises an endmill and includes a shank 12 and a fluted end portion 14 integrally formed with the shank. The fluted end portion 14 has a pair of helical flutes 16 and a pair of cutting edges 18. Each cutting edge 18 is defined by the juncture between a generally radially extending surface 20 which forms a wall of one of the flutes 16 and which may be angularly offset from the radial direction by a rake angle α, and a relief surface 22 which is angularly offset from the circumferential direction by a relief angle ρ. During a cutting operation, the cutting edges 18 engage the material adjacent the surface of the workpiece being machined and remove thin portions or "chips" of metal as the tool is rotated about its axis. The cut chips are guided by the flutes 16 away from the surface being machined. The tool 10 is typically supported in a tool holder which is coaxially affixed to a machine spindle that is rotatably driven about its axis.

When a rotary cutting tool, either of conventional type or one in accordance with the present invention, is rotated at a sufficiently high speed, interactions between the workpiece and the tool will cause the tool to vibrate or chatter as a result of flexing of the tool and/or its associated holder and spindle. Accordingly, the cutting edge of the tool moves in a complex path made up of a rotational component about the tool axis, and non-rotational components including a component generally normal to the surface of the workpiece being machined. As a result, the cutting edge imparts a wavy contour to the machined surface as the cutting edge of the vibrating tool alternately moves toward and away from the workpiece.

At relatively higher rotational speeds of the tool, the waves of the machined surface will have a relatively longer wavelength because the cutting edge will traverse a relatively longer tangential or circumferential distance within the period of one wavelength of the vibrational motion of the tool. In contrast, if the rotational speed of the tool is relatively lower, the waves of the machined surface will have a relatively shorter wavelength because the cutting edge will travel a relatively shorter distance in one period of vibrational motion.

If the rotational speed of the cutter is low enough, the relief surface of the cutter will rub against the wavy surface. When the cutting tool relief surfaces rub on the workpiece in this manner, the tool vibratory motion tends to be damped so that the magnitude of vibration is reduced. However, with a conventional tool of a very hard material, the degree of damping is relatively slight because the tool is not capable of deforming significantly, and thus the tool cannot absorb any significant amount of the impact energy. Accordingly, the vibration amplitude tends not to be reduced by any significant extent.

It will be appreciated that in order to increase the speed of a cutting operation so that the cutting tool can remove greater thicknesses of metal and/or be linearly advanced at a higher speed, it is generally desirable to be able to operate the cutting tool with a high rotational speed without substantial chatter occurring, since the metal removal rate is proportional to the rotational and linear advance rates and the depth of cut. It will also be appreciated that in order to accomplish this objective, it is desirable to increase the rotational speed at which process damping occurs so that the cutting tool can achieve high metal removal rates while the process damping phenomenon keeps the magnitudes of vibration within acceptable limits.

The present invention accomplishes these objectives by providing a cutting tool 10 in which the relief surfaces 22 are coated with a coating 32 (FIG. 4) of a material having a hardness which is less than the hardness of the remainder of the tool 10. The result is that the coating can deform to absorb the impacts caused by the relief surface rubbing on the wavy machined surface of the workpiece. In a particularly advantageous embodiment of the invention, the damping coating 32 has a hardness about equal to the hardness of the workpiece. For example, in a preferred embodiment of the invention adapted for machining aluminum or alloys thereof, the tool 10 is formed of a relatively hard material such as tungsten carbide, steel, or ceremet, and the coating 32 is aluminum or an alloy thereof. However, other materials may be used for the coating 32, including but not limited to non-aluminum metals and alloys, or polymeric materials. The coating 32 preferably has a Brinell hardness of less than about 160.

The coating 32 facilitates a greater degree of process damping because as the cutting tool chatters such that the relief surfaces 22 rub against the workpiece, the softer coating 32 impacts the workpiece and acts to damp the vibration at a greater damping rate than the bare material of the tool itself, thereby reducing or eliminating the vibration relative to a tool with no damping coating on its relief surfaces. Accordingly, the tool 10 may be operated at a higher rotational speed within the acceptable limits of vibration amplitude.

FIG. 5 schematically depicts the interaction between a cutter tooth 18 and a workpiece surface 24 as the cutter tooth is moving in relation to the surface 24 with a rotational velocity component 28 as a result of rotation of the tool about its axis. The long-dashed line represents the workpiece surface 24a defined by the path of the cutter tooth 18 when there is no vibration. The short-dashed line represents the workpiece surface 24b defined by the path of the cutter tooth 18 when there is undamped vibration. The solid line represents the workpiece surface 24c defined by the path of the cutter tooth 18 when the vibration is damped.

Figure 6:
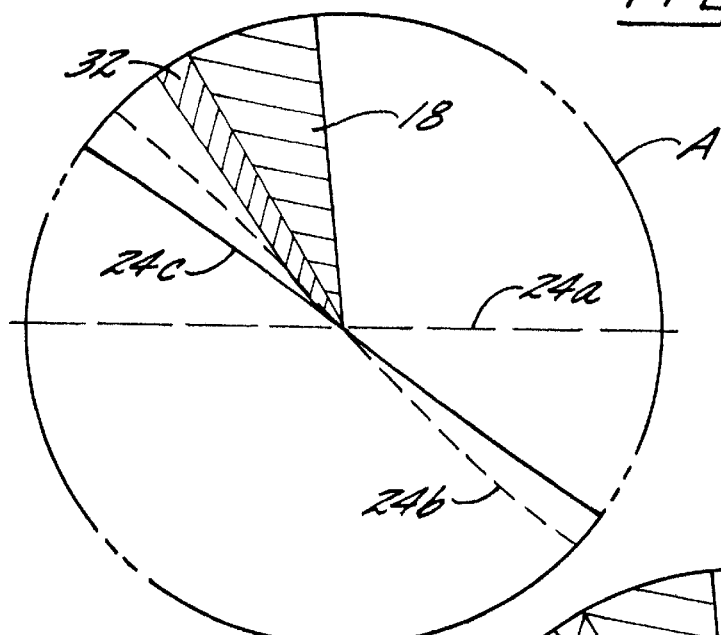
FIG. 6 is an enlarged view of the region A of FIG. 5, showing the cutting edge before the vibration amplitude has been significantly damped.

The cutter tooth 18 on the left in FIG. 5 represents the interaction of a cutter tooth with a workpiece surface before any substantial amount of damping has occurred. Thus, the "damped" vibration path 24c is substantially the same as the undamped vibration path 24b. FIG. 6 is an enlarged view of the cutter tooth in this operating regime. It can be seen that the damping coating 32 on the relief surface of the cutter tooth 18 rubs against the workpiece surface 24b. This causes the coating 32 to be deformed (the coating 32 is shown in the undeformed condition so that the interference can be seen), and the deformation absorbs some of the energy of the impact between the cutter tooth 18 and the workpiece. Accordingly, the vibration is damped and decreases in amplitude.

Figure 7:
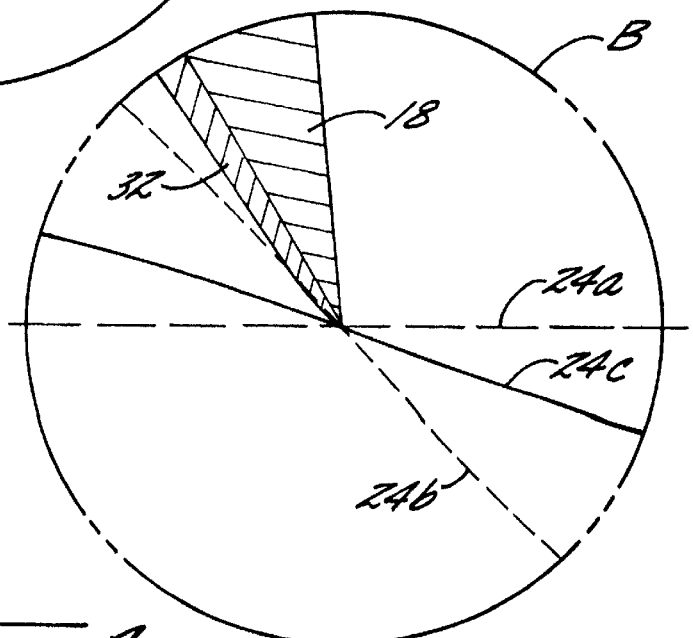
FIG. 7 is an enlarged view of the region B of FIG. 5, showing the cutting edge after the vibration has been substantially damped and the amplitude has decreased.

The cutter tooth 18 on the right in FIG. 5 represents a cutter tooth operating in a reduced-amplitude vibration regime after process damping has occurred, and FIG. 7 is an enlarged view of this cutter tooth. It can be seen that the interference between the coating 32 and the workpiece surface 24c is substantially less than in FIG. 6, so that the amount of deformation of the coating 32 is reduced. Thus, the process damping tends to be self-regulating such that if the vibration amplitude tends to increase, the deformation of the coating 32 increases and causes a greater degree of damping, which tends to reduce the vibration amplitude.

In a preferred embodiment of the invention depicted in FIG. 8, a cutting tool has the entire end portion thereof coated with a generally uniform damping coating 34. Producing the tool in this manner assures that the coating 34 will be applied to the relief surfaces 22 where it is needed, while eliminating the necessity of masking the tool to deposit the coating only on the relief surfaces. The coating 34 advantageously has a thickness of about 0.0005 to about 0.0025 inch, and more preferably about 0.0015 inch, for cutting tools having diameters (defined as the diameter of the circle circumscribed by the cutting edges) of about ¼ inch to about 1 inch and extension lengths from the holding chuck greater than about three times the diameter. The invention is particularly beneficial for cutting tools having a length-to-diameter ratio of about 3 or greater, since these types of tools typically comprise the most flexible part of the cutting apparatus. When the tool is put into service, the relatively softer coating 34 is quickly worn off the cutting edges of the tool, while remaining on at least those portions of the relief surfaces that contact the workpiece during process damping.

In accordance with the invention, two ¼-inch steel ballnose endmills of identical configuration and having a length-to-diameter ratio of about 3 were used to cut an axial slot in the surface of a planar 7075 aluminum alloy workpiece. One of the endmills had a 0.0015-inch coating of aluminum on the fluted end portion of the tool, while the other endmill had no aluminum coating. Both tools were operated at about 17,000 rpm and were linearly advanced at a rate of about 75 inches per minute. The endmill with uncoated relief surfaces was able to operate stably up to a depth of cut of about 0.060 inch. The endmill with the aluminum coating was able to operate stably up to a cut depth of about 0.285 inch.

In another test, two identical ½-inch steel endmills, one coated and the other uncoated, having a length-to-diameter ratio of about 3, were used to cut an axial slot in a 7075 aluminum workpiece at a rotational speed of about 20,000 rpm and a linear advance rate of about 200 inches per minute. The uncoated tool stably cut a slot up to a depth of about 0.225 inch. The coated tool stably cut a slot up to a depth of about 0.250 inch.

It will be appreciated from the foregoing description of certain preferred embodiments of the invention that the invention provides a simple and relatively inexpensive means for damping chatter of a rotary cutting tool, and therefore has unique advantages over prior rotary cutting tools which rely on inserts of damping material or the like which must be separately made and require additional machining operations on the tool to accommodate.

It is also to be understood that although the invention has been explained by reference to preferred embodiments thereof, the invention is not limited to these embodiments. For example, an endmill has been illustrated and described, but the invention is applicable to other types of rotary cutting tools including boring tools and the like. Furthermore, the described and illustrated tools have two cutting edges, but it will be appreciated that the invention is applicable to cutting tools having more than two cutting edges. Other modifications and substitutions of equivalents may be made without departing from the scope of the invention as set forth in the appended claims.

What is claimed is:

1. A rotary cutting tool having enhanced damping, comprising:

a shank;

a fluted end portion formed integrally with the shank, the fluted end portion having a plurality of cutting edges extending along an outer surface thereof and including radially relieved surfaces adjacent to the cutting edges; and a coating of aluminum applied to at least the radially relieved surfaces of the cutting tool, the coating comprising a damping material having a hardness which is less than that of the material from which the cutting tool is made.

2. The cutting tool of claim 1 wherein the cutting tool is made of a material selected from the group consisting of tungsten carbide, steel, and ceremet.

3. The cutting tool of claim 1 wherein the coating is applied to substantially all surfaces of the fluted end portion of the cutting tool.

4. The cutting tool of claim 1 wherein the coating has a thickness of from about 0.0005 inch to about 0.0025 inch.

5. The cutting tool of claim 1 wherein the cutting tool has a length-to-diameter ratio of at least about 3.

6. The cutting tool of claim 1 wherein the cutting tool comprises an endmill.

7. The cutting tool of claim 1 wherein the coating has a Brinell hardness of less than 160.

8. A rotary cutting tool having enhanced damping, comprising:

an elongated shank;

a fluted end portion integrally formed with the shank, the fluted end portion having a plurality of cutting edges extending along an outer surface thereof and including radially relieved surfaces adjacent the cutting edges;

the shank and fluted end portion together defining a length-to-diameter ratio of the tool which is at least about 3; and a coating of aluminum applied to the entire fluted end portion of the tool.

9. The cutting tool of claim 8 wherein the aluminum coating has a thickness of about 0.0005 inch to about 0.0025 inch.

10. The cutting tool of claim 8, wherein the shank and fluted end portion are constructed of a material selected from the group consisting of tungsten carbide, steel, and ceremet.

11. A method of forming a rotary cutting tool to enhance its damping, the method comprising:

providing a cutting tool having a fluted portion including a plurality of cutting edges extending along an outer surface thereof, the fluted portion having radially relieved surfaces adjacent the cutting edges; and applying a coating of a damping material to the radially relieved surfaces.

12. The method of claim 11 wherein the providing step comprises providing a cutting tool formed of one of tungsten carbide, steel, and ceremet, and wherein the applying step comprises applying a coating of aluminum to the radially relieved surfaces.

13. A method of forming a rotary cutting tool to enhance its damping, and comprising:

providing a cutting tool having a fluted end portion including a plurality of cutting edges extending along an outer surface thereof and having radially relieved surfaces adjacent the cutting edges; and applying a coating of a damping material over the fluted end portion of the tool including over the cutting edges and radially relieved surfaces;

the coating of damping material being adapted to be quickly worn off the cutting edges during use of the tool while remaining on at least portions of the radially relieved surfaces.

14. The method of claim 13 wherein the providing step comprises providing a cutting tool having a fluted end portion formed of one of tungsten carbide, steel, and ceremet, and the applying step comprises applying an aluminum coating over the fluted end portion.

15. The method of claim 14 wherein the damping material comprises aluminum and wherein the applying step comprises applying a generally uniform coating of the damping material on the fluted end portion with a coating thickness of about 0.0005 inch to about 0.0025 inch.

16. A rotary cutting tool having enhanced damping, comprising:

a shank;

a fluted end portion formed integrally with the shank, the fluted end portion having a plurality of cutting edges extending along an outer surface thereof and including radially relieved surfaces adjacent to the cutting edges; and a coating applied to the radially relieved surfaces of the cutting tool while the remainder of the cutting tool is free of the coating, the coating comprising a damping material having a hardness which is less than that of the material from which the cutting tool is made.

17. The cutting tool of claim 16, wherein the fluted end portion is made of a material selected from the group consisting of tungsten carbide, steel, and ceremet, and the coating is aluminum.

* * * * *